United States Patent [19]
Sonozaki et al.

[11] Patent Number: 6,048,639
[45] Date of Patent: Apr. 11, 2000

[54] THIN TYPE SEALED CELL AND PRODUCING METHOD THEREOF

[75] Inventors: Tsutomu Sonozaki; Hiroyuki Ohno, both of Hyogo; Ikuro Nakane; Satoshi Narukawa, both of Sumoto, all of Japan

[73] Assignee: Sanyo Electric Co., Ltd., Moriguchi, Japan

[21] Appl. No.: 09/232,655

[22] Filed: Jan. 19, 1999

[30] Foreign Application Priority Data

Jan. 21, 1998 [JP] Japan ................................. 10-009457

[51] Int. Cl.[7] ............................. H01M 6/00; H01M 2/00
[52] U.S. Cl. ............................................ 429/127; 429/163
[58] Field of Search ................................ 429/127, 163, 429/162, 167, 168

[56] References Cited

U.S. PATENT DOCUMENTS

| | | |
|---|---|---|
| 3,375,136 | 3/1968 | Biggar . |
| 4,997,732 | 3/1991 | Austin et al. ............................. 429/153 |
| 5,326,652 | 7/1994 | Lake ........................................ 429/127 |
| 5,445,856 | 8/1995 | Chaloner-Gill ........................ 428/35.9 |
| 5,478,668 | 12/1995 | Gozdz et al. .......................... 429/127 |

*Primary Examiner*—Maria Nuzzolillo
*Assistant Examiner*—Tracy Dove
*Attorney, Agent, or Firm*—Armstrong, Westerman, Hattori, McLeland & Naughton

[57] ABSTRACT

In a thin type sealed cell utilizing a cell case made of a laminated material, a storage life and reliability of the cell is increased by preventing a sectional surface at an end of the laminated material from being exposed in the cell case, and thereby a leakage of an electrolyte out of the cell and a short circuit in the cell are avoided. This is achieved by disposing a resin layer on the inner surface of the cell case composed of a sheet type laminated material, and covering the sectional surface existing inside the cell case with resin.

2 Claims, 21 Drawing Sheets

THIN TYPE SEALED CELL AND PRODUCING METHOD THEREOF

BACKGROUND OF THE INVENTION (1) Field of the Invention

This invention relates to a thin type sealed cell comprising a cell case or enclosing an electrolyte and a power generating element, the cell case made of a sheet type laminated material having a sectional surface in which each of the layers composing the laminated material is exposed, the layers being an aluminum layer and an adhesive layer and a resin layer. The invention more particularly relates to a construction of a cell case using the laminated material and a method of producing such a cell case.

(2) Description of the Prior Art

In recent years, more reduced sizes and weights have been required for electric cells in connection with a size reduction trend of electronic devices. In view of such requirements, the present inventors have suggested in Japanese Unexamined Patent Publication No. 10-214606 a thin sealed battery utilizing a cell case made of a laminated material formed into a bag-like shape in which an aluminum layer is sandwiched by resin layers formed on both surfaces of the aluminum layer with an adhesive layer interposed therebetween. According to the construction suggested in the above Japanese Unexamined Patent Publication No. 10-214606, owing to the fact that such laminated materials are lightweight and thin, and moreover can be hermetically sealed easily by heat-bonding, a small-sized and lightweight thin sealed battery capable of achieving very high productivity is realized.

While the above prior art thin sealed battery has such a desirable feature as described above, it also has certain drawbacks with regard to a storage life and reliability of the cell. More specifically, a sheet type laminated material used for such cells has exposed sectional surfaces in which an aluminum layer, an adhesive layer, and a resin layer are exposed, and therefore if the exposed sectional surfaces exist inside an enclosure chamber, which encloses a power generating element and an electrolyte, the electrolyte infiltrates from the exposed sectional surfaces. As a result of this, an adhesive strength of the adhesive layers is weakened, and the aluminum layer and the resin layers are detached in the end, resulting in a leakage of the electrolyte out of the cell.

If such detachment of the aluminum layer and the resin layer occurs, not only is the leakage of the electrolyte caused, but also an infiltration of moisture into the cell is induced. As a result of the infiltration of water, for example, in batteries using a non-aqueous electrolyte including $LiPF_6$ and the like as a solute, a fluoric acid is generated by the reaction of the water and $LiPF_6$, and the generated fluoric acid further reacts with the aluminum. As a consequence of this, the aluminum layer is corroded, and a further leakage of the electrolyte is caused from the corroded part. These result in a rapid deterioration of cell performance.

In addition, if the detachment of the aluminum layer and the resin layer is caused by the reaction of the adhesive and the electrolyte in the exposed sectional surfaces, the aluminum layer thus exposed makes contact with a negative electrode, resulting in an internal short circuit. Again, this results in a rapid deterioration of cell performance.

SUMMARY OF THE INVENTION

In view of the above problems, it is an object of the present invention to provide a thin type sealed cell excellent in a storage life and reliability by establishing a construction of a cell case free from the deterioration of cell performance caused by corrosion of sectional surfaces at end portions of a laminated material constituting such a cell case, and to provide a method of producing such a cell case.

This and other objects are accomplished in accordance with a first aspect of the present invention by providing a thin type sealed cell comprising a cell case composed of a sheet type laminated material in which a resin layer is laminated on both surfaces of an aluminum layer with an adhesive layer interposed between the resin layer and aluminum layer, the cell case being formed by bonding together both end portions of the laminated material so as to form an enclosure chamber, the sealed cell further comprising an electrolyte and a power generating element both of which are enclosed in the enclosure chamber, the sealed cell characterized in that:

at least one of the end of the laminated material exists in the enclosure chamber, and a sectional surface of the end is covered with a resin.

According to this aspect of the invention, the sectional surface at the end portion of the laminated material, which exists inside the enclosure chamber, is covered with resin, and therefore the electrolyte cannot infiltrate through the interfaces between each layer. Thus, it is made possible to prevent such undesirable effects as a leakage of the electrolyte and an internal short circuit, both of which are caused by deterioration of an adhesive strength of the adhesive layer and corrosion of the aluminum layer.

In accordance with a second aspect of the invention, there is provided a thin type sealed cell comprising a cell case composed of a sheet type laminated material in which a resin layer is laminated on at least one surface of an aluminum layer with an adhesive layer interposed between the resin layer and aluminum layer, the laminated material having an exposed sectional surface in which each of the layers is exposed, the cell case being formed by overlapping each other and bonding together both end portions adjacent to a pair of the exposed sectional surfaces at each end of the laminated material so as to form an enclosure chamber, the sealed cell further comprising an electrolyte and a power generating element both of which are enclosed in the enclosure chamber, the sealed cell characterized in that:

the pair of the exposed sectional surfaces of the laminated material exist outside the cell case and do not exist inside the enclosure chamber.

According to this aspect of the invention, the exposed sectional surface of the laminated material do not exist inside the enclosure chamber, and it is thereby made possible to prevent the deterioration of the cell performance without fail.

Such a cell construction in which the exposed sectional surfaces do not exist inside the enclosure chamber is achieved by the producing method in accordance with the fourth aspect of the invention set forth hereinbelow.

In accordance with a third aspect of the invention, there is provided a thin type sealed cell comprising a cell case composed of a sheet type laminated material in which a resin layer is laminated on at least one surface of an aluminum layer with an adhesive layer interposed between the resin layer and aluminum layer, the laminated material having an exposed sectional surface in which each of the layers is exposed, the cell case being formed by overlapping each other and bonding together both end portions adjacent to a pair of the exposed sectional surfaces at each end of the laminated material so as to form an enclosure chamber, the sealed cell further comprising an electrolyte and a power generating element both of which are enclosed in the enclosure chamber, the sealed cell characterized in that:

an inner surface of the cell case is the resin layer; and the pair of the exposed sectional surfaces are disposed inside the enclosure chamber and are covered with a resin.

The resin that is stable to the cell components such as the electrolyte is used for the present invention. Therefore, according to this aspect of the invention, since the inner wall of the cell (the wall of the enclosure chamber) is composed of the resin layer, the electrolyte and the like can be enclosed in a stable condition for a long period. Moreover, according to this construction, since the resin that covers the exposed sectional surfaces protects the adhesive layer and the aluminum layer from making contact with the electrolyte, the deterioration of cell performance caused by the reaction of the exposed sectional surfaces and the electrolyte is prevented even if the exposed sectional surfaces are disposed inside the enclosure chamber.

Such a cell construction in which the exposed sectional surfaces are covered with resin is achieved by the producing methods in accordance with the fifth to eighth aspects of the invention set forth hereinbelow. It is noted that an outer surface of the cell case may be the aluminum layer, since the outer surface is not in contact with the electrolyte and the like. However, in such an event that the cell is bent, the outer surface of the cell case is susceptible to a crack or the like undesirable effects if the outer surface is composed only of the aluminum layer. Therefore, in view of the strength, it is preferable to employ a laminate material in which the resin layer is disposed on both surfaces of the material.

In accordance with a fourth aspect of the invention, there is provided a method of producing a thin type sealed cell comprising the steps of:

producing a cell case having an enclosure chamber therein by overlapping both ends of a sheet type laminated material in which a resin layer is laminated on at least one surface of an aluminum layer with an adhesive layer interposed between the resin layer and aluminum layer, the laminated material having a pair of exposed sectional surfaces at each end of the laminated material, the sectional surfaces in which each of the layers is exposed, and thereafter fuse-bonding the pair of end portions together so as to form the enclosure chamber; and enclosing an electrolyte and a power generating element into the enclosure chamber, in which the step of producing a cell case is such that the resin layer formed on a surface of the laminated layer is disposed inside the cell case, and both inner surfaces of the laminated material each adjacent to each of the exposed sectional surfaces are overlapped each other so as to form an overlapped part, and thereafter the overlapped part is fuse-bonded.

According to this aspect of the invention, in fuse-bonding together the end portions of the laminated material, the inner surfaces at the end portions of the laminated material are overlapped each other. As a result of this, the exposed sectional surfaces of the laminated material are always made to exist outside the enclosure chamber. Therefore, this construction makes it possible, without incurring any increase of cost, to prevent the decrease of the adhesive strength in the adhesive layer and the corrosion of the aluminum layer, both of which are caused by the contact of the exposed sectional surfaces with the electrolyte.

In this aspect, the resin layer is disposed on the inner surface of the cell case, and this has the same effects as described in the above third aspect of the invention, and the same applies to the following other aspects of the invention hereinbelow. In addition, the resin layer may be formed on both surfaces of the cell case as a matter of course. This may also be applied to the following other aspects of the invention set forth hereinbelow.

As a fifth aspect of the invention, the step of producing the cell case in the above fourth aspect of the invention may be such a step that the resin layer formed on the laminated material is disposed inside the cell case, and an inner surface of the laminated material adjacent to one of the exposed sectional surfaces is overlapped on an outer surface of the laminated material adjacent to the other exposed sectional surface so as to form an overlapped part, and thereafter the overlapped part is fuse-bonded using a heating element having a width larger than a width of the overlapped part.

When different surfaces of the laminated material (the inner surface and the outer surface) are overlapped together to form a cylindrical structure, the exposed sectional surface at one end of the laminated material is made to exist inside the cylindrical structure, i.e., inside the enclosure chamber. However, if the overlapped part is heated with a heating element having a width larger than the width of the overlapped part, the resin layer adjacent to the exposed sectional surface is fused, and thereby the sectional surface is covered by fused resin, forming a coating. This coating of resin protects the exposed sectional surface from a contact with the electrolyte, thereby preventing the deterioration of the adhesive strength of the adhesive layer and the corrosion of the aluminum layer.

As a sixth aspect of the invention, the step of producing the cell case in the above fourth aspect of the invention may be such a step that the resin layer formed on the laminated material is disposed inside the cell case, and an inner surface of the laminated material adjacent to an end of one of the exposed sectional surfaces is overlapped on an outer surface of the laminated material adjacent to an end of the other exposed sectional surface so as to form an overlapped part, and a resin sheet is disposed on an adjacent part to the exposed sectional surface disposed inside the cell case, and thereafter the overlapped part is fuse-bonded using a heating element having a width larger than a width of the overlapped part.

In this aspect too, the exposed sectional surface at one end of the laminated material is made to exist in the enclosure chamber. However, since the resin sheet is disposed on a portion adjacent to the end of the laminated material, the resin sheet is fused by heating the overlapped part, covering the exposed sectional surface. Therefore, the exposed sectional surface does not make a direct contact with the electrolyte.

According to the above construction in which the resin sheet is employed, the exposed sectional surface is more securely covered with resin in comparison with the above fifth aspect.

In accordance with a seventh aspect of the invention, there is provided a method of producing a thin type sealed cell comprising the steps of:

producing a cell case having an enclosure chamber therein by overlapping both ends of a sheet type laminated material in which a resin layer is laminated on both surfaces of an aluminum layer with an adhesive layer interposed between the resin layer and aluminum layer, the laminated material having a pair of exposed sectional surfaces at each end of the laminated material, the sectional surfaces in which each of the layers is exposed, and thereafter fuse-bonding the pair of end portions together so as to form the enclosure chamber; and enclosing an electrolyte and a power generating element into the enclosure chamber, in which the step of producing a cell case is such that the pair of exposed sectional surfaces are disposed inside the enclosure chamber, and both outer surfaces of the laminated material each adjacent to each of the exposed sectional surfaces are overlapped each other so as to form an overlapped part, and thereafter a resin sheet is disposed on an adjacent part to the exposed sectional surfaces, and the overlapped part is fuse-bonded together with the resin sheet.

According to this aspect of the invention, in forming a cylindrical shaped structure with the laminated material, each end of the laminated material is so overlapped over the other end that both surfaces to be attached in these two overlapped ends are the outer surface of the laminated material. Thereby, the pair of the exposed sectional surfaces are made to exist inside the enclosure chamber. However, since the resin sheet is disposed on the adjacent portion of the ends of the laminated material, in fuse-bonding, the resin sheet is fused and covers the exposed sectional surfaces. Therefore, even in the case of the pair of the exposed sectional surfaces being disposed inside the enclosure chamber, it is made possible to avoid such problems as the deterioration of the adhesive strength of the adhesive layer and the corrosion of the aluminum, both of which are caused by the reaction of the electrolyte and the adhesive. Moreover, according to this aspect, since the overlapped part does not exist on the outer surface of the cell, which is visible to users, there is such an advantage that the resulting cell retains a fine appearance.

As an eighth aspect of the invention, the step of producing the cell case in the above seventh aspect of the invention may be such a step that the pair of exposed sectional surfaces are disposed inside the enclosure chamber, and both outer surfaces of the laminated material each adjacent to each of exposed sectional surfaces are overlapped each other so as to form an overlapped part, and a foremost end part of the overlapped part is folded so as to be closely attached on a surface of the resin layer, and the overlapped part including a folded surface is fuse-bonded.

According to this aspect of the invention, the foremost end of the overlapped part, which exists inside the cell case, is folded inwardly, and the folded part is closely attached to a portion of the resin layer, and then the overlapped part, which includes the folded portion, is fuse-bonded with being kept in this state. Employing such a method, the exposed sectional surfaces at the foremost end of the overlapped part is consequently wrapped up in the resin layer, thereby being isolated from the enclosure chamber. In addition, since the folded portion including the foremost end, and the resin layer except the folded portion are fuse-bonded, and a coating is formed on the exposed sectional surfaces by the fused resin, the exposed sectional surfaces can be isolated from the enclosure chamber.

As a ninth aspect of the invention, the step of producing the cell case in the above seventh aspect of the invention may be such a step that the pair of exposed sectional surfaces are disposed inside the enclosure chamber, and both outer surfaces of the laminated material each adjacent to each of exposed sectional surfaces are overlapped each other so as to form an overlapped part, and a foremost end part of the overlapped part is rolled inwardly so that the exposed sectional surfaces are not exposed in the enclosure chamber, and thereafter the overlapped part including a rolled portion is fuse-bonded.

According to this aspect of the invention, the exposed sectional surfaces are more securely wrapped up in the resin layer, since the foremost end of the overlapped portion is rolled inwardly in order for the pair of the exposed sectional surfaces to be isolated from the enclosure chamber.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

Now referring to the figures, the preferred embodiments of the present invention is detailed on the basis of the examples below.

EXAMPLE 1

Figure 1:
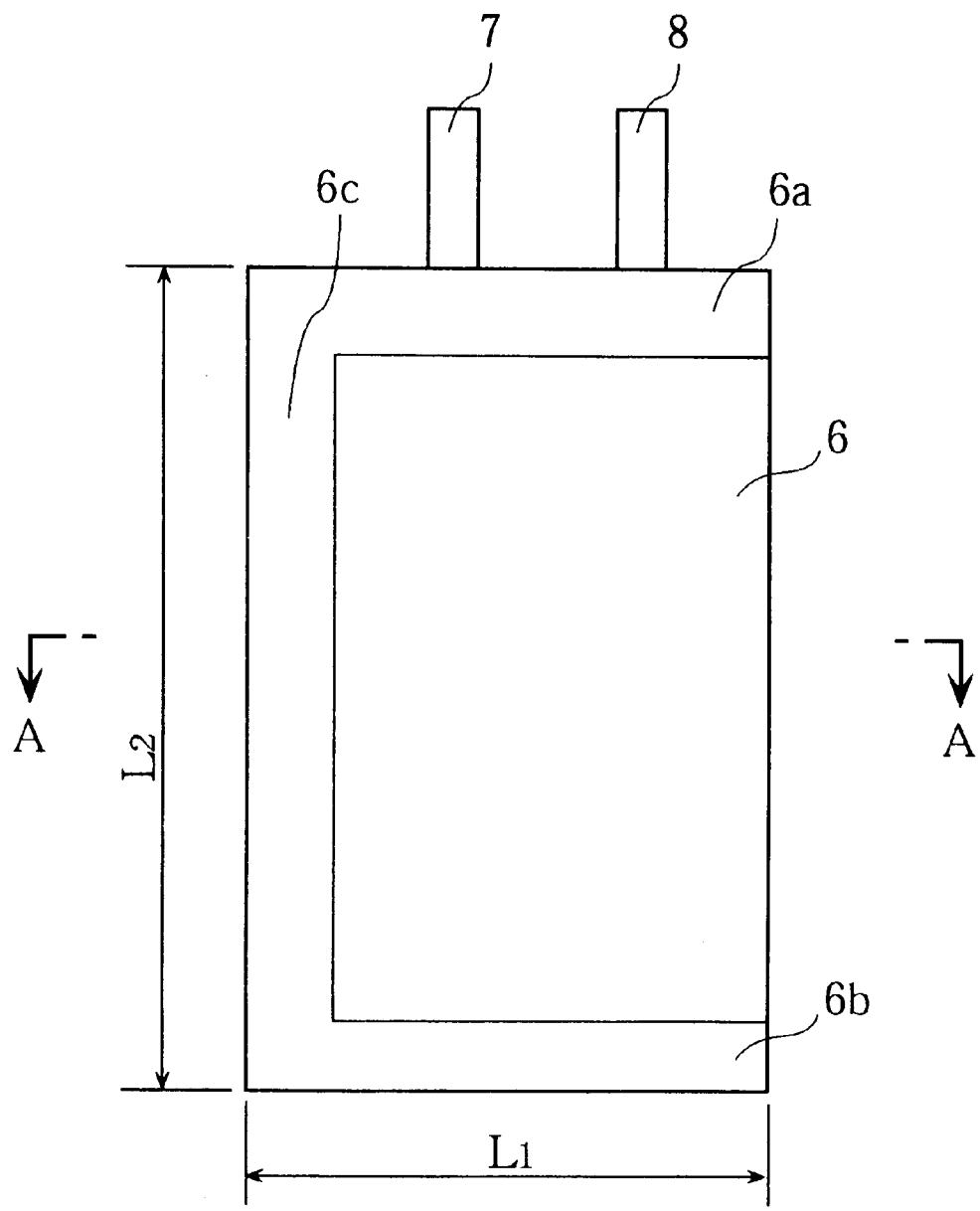
FIG. 1 is a front view of a thin type sealed cell according to Example 1 of the present invention.
Figure 2:
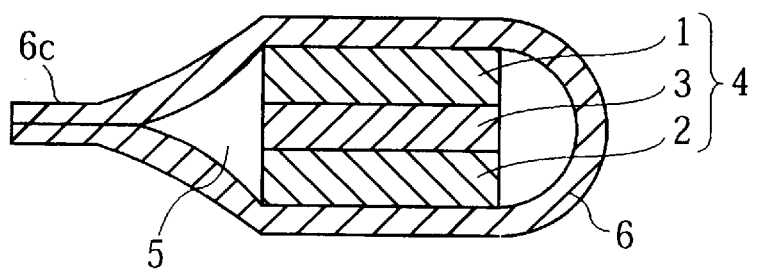
FIG. 2 is a cross-sectional view of FIG. 1 taken along the line A—A.
Figure 3:
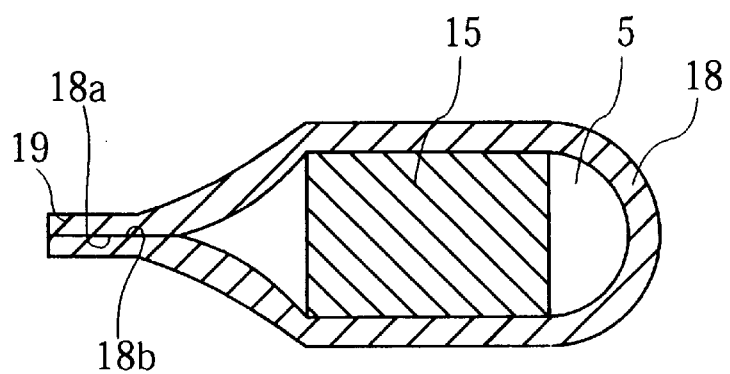
FIG. 3 is a cross-sectional view for explaining the steps of producing a thin type sealed cell according to Example 1 of the present invention.
Figure 4:
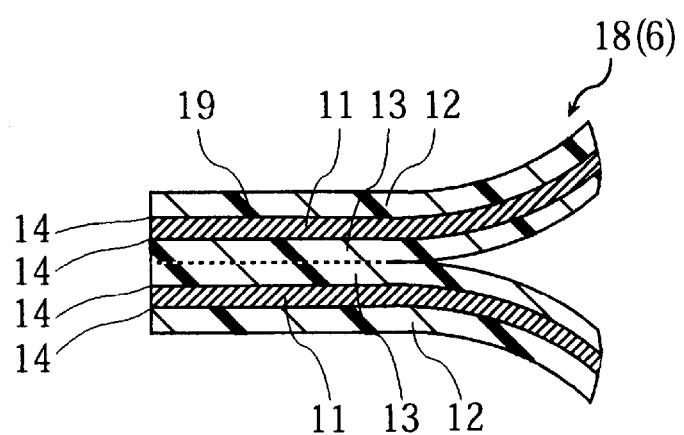
FIG. 4 is an enlarged cross-sectional view of a bonded part of a thin type sealed cell according to Example 1 of the present invention.

With reference to FIGS. 1 to 4, a thin type sealed cell of Example 1 is detailed below. FIG. 1 shows a front view of a thin type sealed cell of Example 1. FIG. 2 shows a cross-sectional view of FIG. 1 taken along the line A—A, FIG. 3 shows a cross-sectional view for explaining the steps of producing a thin type sealed cell according to Example 1. FIG. 4 shows an enlarged cross-sectional view of a bonded portion thereof.

In a thin type sealed cell according to the present invention, there are provided a positive electrode composed of $LiCoO_2$, a negative electrode composed of a carbon material, and a separator 3 for separating these electrodes 1 and 2, so as to form a power generating element 4. This power generating element 4 is, as shown in FIG. 2, disposed in an enclosure chamber 5 in a cell case 6, and the enclosure chamber 5 is formed by sealing an upper end portion and a lower end portion and a left side end portion at each sealed portion 6a, 6b, and 6c respectively. The enclosure chamber 5 is further filled with an electrolyte in which $LiPF_6$ is dissolved at a rate of 1M (mol/liter) in a mixed solvent of ethylene carbonate (EC) and diethyl carbonate (DEC) mixed at a volume ratio of 3:7.

The description is now directed to a more particular construction of the cell case 6 (thickness: 100 μm). As shown in FIG. 4, on one surface of an aluminum layer 11 (thickness: 30 μm), a resin layer 12 (thickness: 30 μm) composed of polypropylene is bonded with an adhesive layer (thickness: 5 μm, not shown) interposed therebetween. Likewise, on the other surface of the aluminum layer 11, a resin layer 13 (thickness: 30 μm) composed of polypropylene is bonded with an adhesive layer (thickness: 5 μm, not shown) interposed therebetween. According to this construction, exposed interfaces 14 (may be referred to as "exposed sectional surfaces") between the aluminum layer 11 and the resin layers 12 and 13, which exist at the end portions of the cell case 6, exist outside the cell. Having such a structure, the electrolyte cannot infiltrate through the interfaces 14, and it is thereby made possible to prevent the laminate material from degradation caused by the electrolyte.

The cell according to Example 1 further has a construction in which the positive electrode 1 is connected with a positive electrode current collector terminal 7 and the negative electrode 2 is connected with a negative electrode current collector terminal 8, which enables the chemical energy generated in the cell to be extracted from the cell and utilized as an electrical energy. The cell is so constructed that a width L1 is 36 mm, a length L2 is 65 mm, and widths 6a, 6b, and 6c of the sealed portions are 5 mm.

The production of the cell having the above construction is now detailed below.

Firstly, a sheet type laminated material 18 composed of five layers, a resin layer (polypropylene) / an adhesive layer / an aluminum alloy layer / an adhesive layer / a resin layer (polypropylene), is prepared, and the laminated material 18 is formed to have a tube-like shape by overlapping and attaching together inner surfaces 18a and 18b adjacent to the end portions of the laminated material 18, and the overlapped portion 19 is fuse-bonded under the state where a base 15 is disposed inside the tube-like shaped laminated material 18. A sealed portion 6c is thus formed (see FIGS. 1 and 2). Subsequently, the power generating element 4 is inserted through an open end part of the tube-like shaped laminated material 18. In the insertion, the power generating element 4 is so disposed that the current collector terminals 7 and 8 are protruded from one open end of the laminated material 18, and the open end of the laminated material 18 from which the current collector terminal 7 and 8 are protruded is bonded using a high frequency induction welding device. A sealed portion 6a is thus formed. Thereafter, a resulting tube-like shaped case made of the laminated material 18, in which the power generating element 4 is enclosed, is subjected to a vacuum heat drying (temperature: 105° C.) for 2 hours in order to remove moisture in the laminated material 18 and the power generating element 4. Subsequent to this, the electrolyte in which a solute, $LiPF_6$, is dissolved with a rate of 1 M (mol/liter) in the mixed solvent in which ethylene carbonate to diethyl carbonate are mixed with a volume ratio of 3:7, is poured into the tube-like shaped case, and the case is left under this state for 1 hour. Thereafter, the other end part of the laminated material 18 opposed to the above-mentioned sealed portion 6a is welded using an ultrasonic welding device, with applying pressure by a metal plate to the power generating element 4 via the laminated material 18. A sealed portion 6b is thus formed. Thus, a thin type sealed cell is completed.

From the step of pouring the electrolyte onwards, the production is carried out in a dry box with an argon atmosphere.

A cell produced in accordance with the above-described manner is herein after referred to as a "cell A1" of the present invention.

It is to be noted that the resin layer for the above cell case is not limited to polypropylene. For example, polyolefin polymer such as polyethylene, polyester polymer such as polyethylene terephthalate, polyvinylidene polymer such as polyvinylidene fluoride and polyvinylidene chloride, polyamide polymer such as nylon 6, nylon 6.6, and nylon 7, and the like may be used for the resin layer.

It is also to be noted that it is preferable that a thickness of the resin layer be within the range of 1 μm to 500 μm, or more preferably be 5 μm to 100 μm. In addition, it is preferable that a thickness of a metal layer be within the range of 0.1 μm to 200 μm, or more preferably be 1 μm to 50 μm. This is due to the following reasons. Firstly, if the thickness of the metal layer and that of the resin layer are too small, oxygen permeability is decreased and thereby cell characteristics are deteriorated. On the other hand, if the thickness of the resin layer is too large, moldability is reduced. In addition, if the thickness of the metal layer is rendered too large, it leads to such disadvantages that the weight of the cell is increased and the flexibility of the cell is deprived. In view of these, it is preferable that a thickness of a resin/metal laminated material as a whole be within the range of 10 μm to 200 μm.

Furthermore, the material for the positive electrode is not limited to $LiCoO_2$, but may include $LiNiO_2$, $LiMn_2O_4$, combinations of these, and the like.

It is understood that the present invention is not limited to the lithium ion cells as described above, but may be suitably applied for other types of cells such as polymer cells in which a solid electrolyte is used between a positive electrode and a negative electrode, and the like cells.

In the above example, the base 15 is used when forming the laminated material 18 into a tube-like shape, but it is understood that the methods for forming the laminated material 18 is not limited to such a manner, but other methods may be employed. For example, the power generating element 4 may be used to form the laminated material 18 into a tube-like shape in place of the base 15.

EXAMPLE 2

Figure 5:
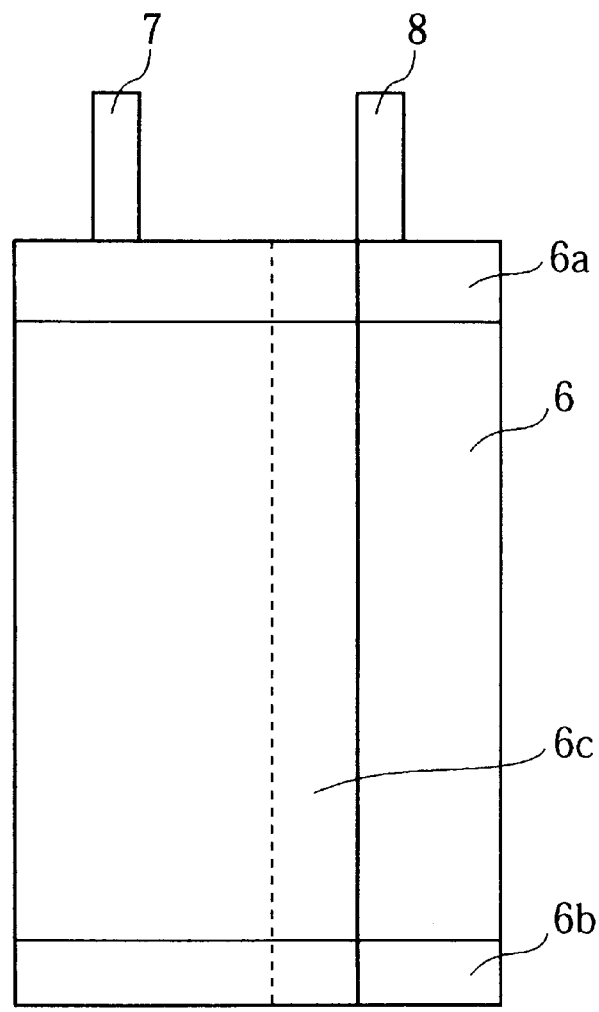
FIG. 5 is a rear view of a thin type sealed cell according to Example 2 of the present invention.
Figure 6:
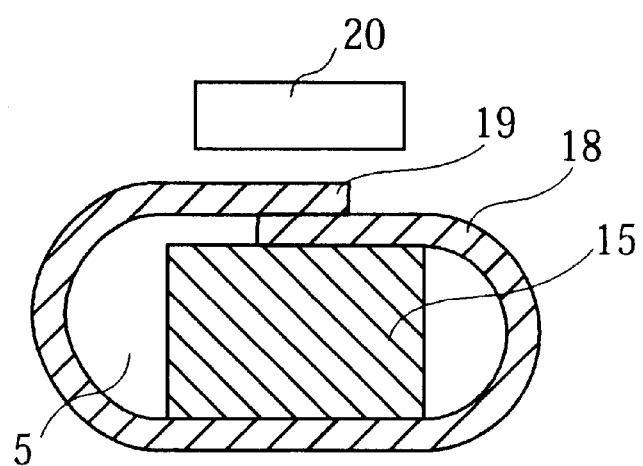
FIG. 6 is a cross-sectional view for explaining the steps of producing a thin type sealed cell according to Example 2 of the present invention.
Figure 7:
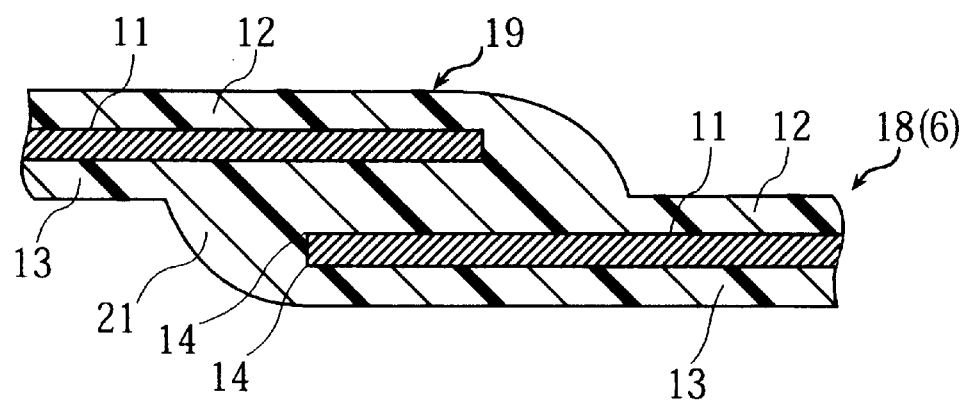
FIG. 7 is an enlarged cross-sectional view of a bonded part of a thin type sealed cell according to Example 2 of the present invention.

Referring now to FIGS. 5 to 7, a thin type sealed cell according to Example 2 is described hereinafter. It is noted that for the sake of brevity, the same reference characters as in Example 1 are used for the members having the same functions as those in Example 1, and the descriptions for those are omitted.

FIG. 5 shows a rear view of a thin type sealed cell according to Example 2. FIG. 6 is for explaining the steps of producing the cell. FIG. 7 shows an enlarged cross-sectional view of a bonded portion of the cell. As shown in the figures, a cell case according to Example 2 differs from that of Example 1 in that a sealed portion 6c is formed on the back and in that only one of the pair of exposed sectional surfaces exists outside the enclosure chamber.

The sealed portion 6c is, as shown in FIG. 7, formed by fuse-bonding together a resin layer 13 on the inner surface of the laminated material 18 and a resin layer 12 on the outer surface of the laminated material 18. In this step, a heater die having a larger width (25 mm) than the width of the overlapped part 19 (20 mm) is used to form a sealed portion 6c, as shown in FIG. 6. According to this, since the resin layers 12 and 13 adjacent to the exposed interfaces 14 are fused in fuse-bonding, each of the exposed interfaces 14 (exposed sectional surfaces) is covered by a resin 21. Hence, it is made possible to prevent the exposed sectional surfaces being inside the cell from being in contact with the electrolyte.

The cell produced in accordance with the above manner is hereinafter referred to as a "cell A2" of the present invention.

EXAMPLE 3

Now referring to FIGS. 8 to 10, there is described Example 3 below. It is noted that the same reference characters as in Example 1 are used for the members having the same functions as those in Example 1, and the descriptions for those are omitted.

Figure 8:
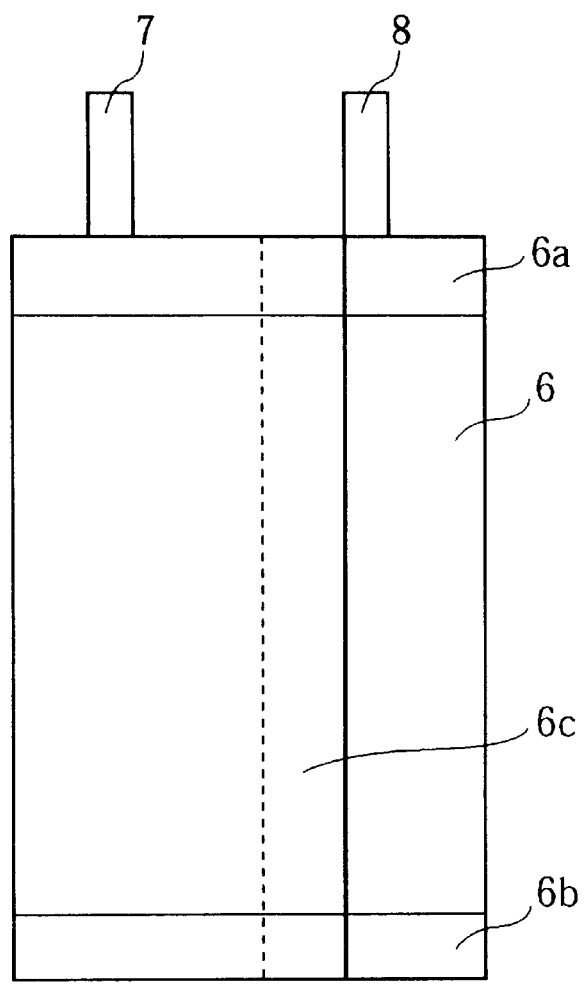
FIG. 8 is a rear view of a thin type sealed cell according to Example 3 of the present invention.
Figure 9:
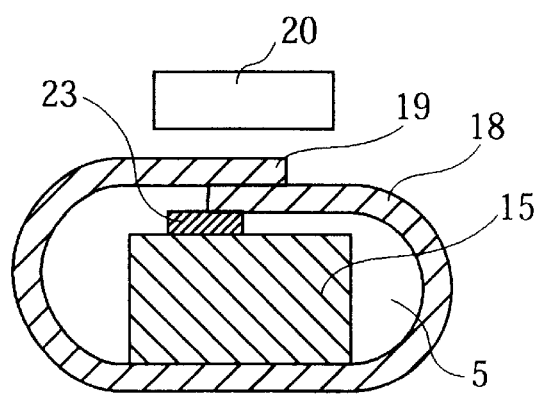
FIG. 9 is a cross-sectional view for explaining the steps of producing a thin type sealed cell according to Example 3 of the present invention.
Figure 10:
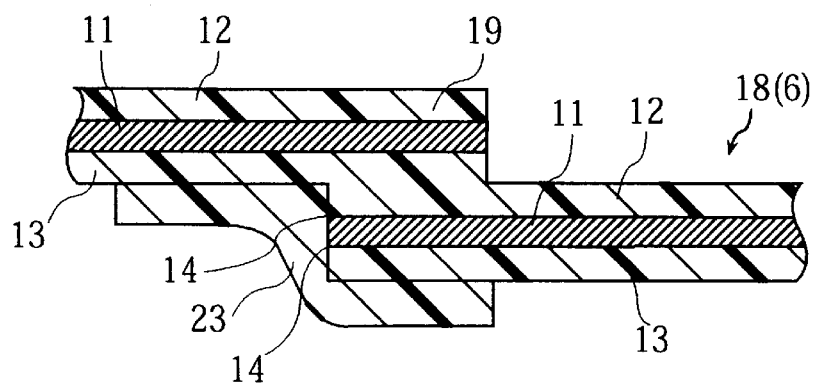
FIG. 10 is an enlarged cross-sectional view of a bonded part of a thin type sealed cell according to Example 3 of the present invention.

FIG. 8 shows a rear view of a thin type sealed cell according to Example 3, FIG. 9 is for explaining the steps of producing the cell, and FIG. 10 shows an enlarged cross-sectional view of a bonded portion of the cell. As shown in FIGS. 8 and 9, Example 3 differs from Example 1 in the following points, in addition to the points that a sealed portion 6c is formed on the back of the cell case and that only one of the pair of exposed sectional surfaces exists outside the enclosure chamber.

The sealed portion 6c is, as illustrated in FIG. 10, formed by fuse-bonding together the resin layer 13 on the inner surface of the laminated material 18 and the resin layer 12 on the outer surface of the laminated material 18. In the step of fuse-bonding, as shown in FIG. 9, a sheet-like shaped resin spline 23 (width: 5 mm, thickness: 50 $\mu$m) composed of polypropylene is disposed on a part of the inner surface of the laminated material 18 adjacent to the exposed interfaces 14, and the bonded portion 19 and the resin spline 23 are fuse-bonded together using the heater die 20 having a width larger than the width of the bonded portion 19. A sealed portion 6c, in which the exposed sectional surfaces with the exposed interfaces 14 is covered with the resin spline 23, is thus formed. According to this construction, it is possible to avoid such disadvantages as the degradation of the adhesive layers caused by the contact of the exposed sectional surface with the electrolyte and the exfoliation of the aluminum layer.

It is noted that in this Example 3, although the heater die 20 with a width larger than the width of the bonded portion 19 is used, the width of the heater die may be made approximately the same width as the width of the bonded portion 19, if the heating time is made longer or the heating temperature is made higher. However, for the reason that the temperature in fuse-bonding can be made lower, it is preferable to make the width of the heater die 20 larger than the width of the bonded portion 19.

The cell produced according to the above manner is hereinafter referred to as a "cell A3" of the present invention.

EXAMPLE 4

Figure 12:
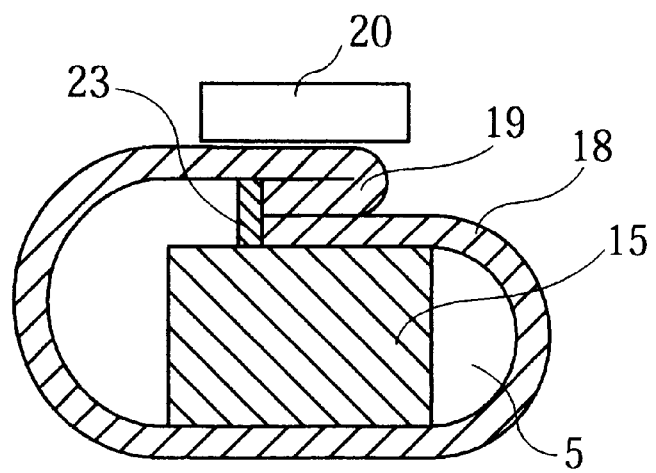
FIG. 12 is a cross-sectional view for explaining the steps of producing a thin type sealed cell according to Example 4 of the present invention.
Figure 13:
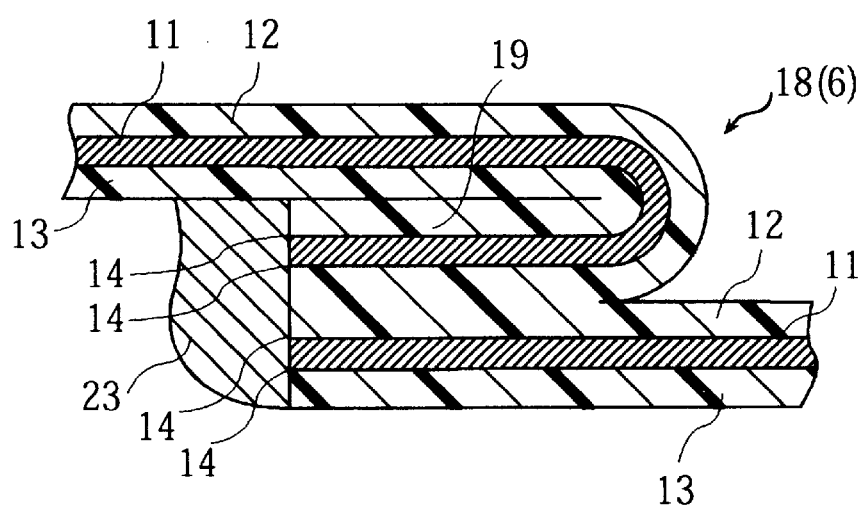
FIG. 13 is an enlarged cross-sectional view of a bonded part of a thin type sealed cell according to Example 4 of the present invention.

Now referring to FIGS. 11 to 13, there is described Example 4 below. It is noted that the same reference characters as in Example 1 are used for the members having the same functions as those in Example 1, and the descriptions for those are omitted.

Figure 11:
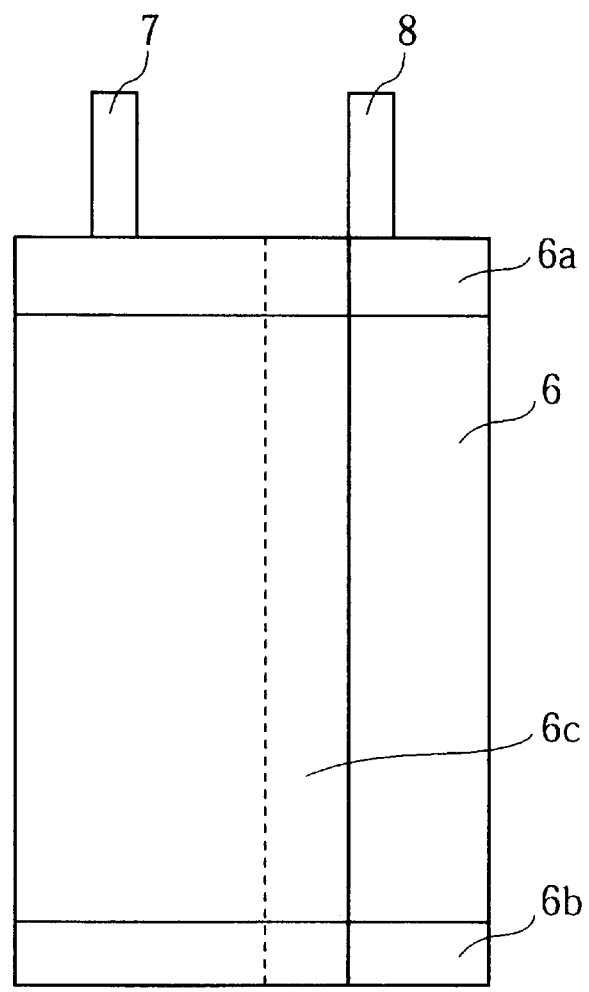
FIG. 11 is a rear view of a thin type sealed cell according to Example 4 of the present invention.

FIG. 11 shows a rear view of a thin type sealed cell according to Example 4. FIG. 12 is for explaining the steps of producing the cell. FIG. 13 shows an enlarged cross-sectional view of a bonded portion of the cell. As shown in FIGS. 11 to 13, Example 4 differs from Example 1 in the following matters. The sealed portion 6c is formed on the back of the cell case, and one end portion of the laminated material 18 is folded inwardly, and the outer surface area of the end portion is overlapped with the other outer surface area of to the other end portion. In addition, as shown in FIG. 12, in fuse-bonding, the resin spline 23 is disposed adjacent to the exposed interfaces (exposed sectional surfaces) 14 of the aluminum layer 11 and the resin layers 12 and 13, and the heater die 20 having a width larger than the width of the sealed portion 6c is used in forming the sealed portion 6c by fuse-bonding.

In this construction of Example 4, a pair of the exposed sectional surfaces are located inside the enclosure chamber of the cell case. However, since the exposed sectional surfaces are covered with the resin spline 23, it is made possible to prevent the exposed interfaces 14 from making contact with the electrolyte and the like.

It is noted that as well as in the above Example 3, in this Example 4 the heater die 20 having approximately the same width as the width of the overlapped portion 19 may be employed, if the heating time is made longer or the heating temperature is made higher.

EXAMPLE 5

Now referring to FIGS. 14 to 17, Example 5 is described below. It is noted that the same reference characters as in Example 1 are used for the members having the same functions as those in Example 1, and the descriptions for those are omitted.

Figure 14:
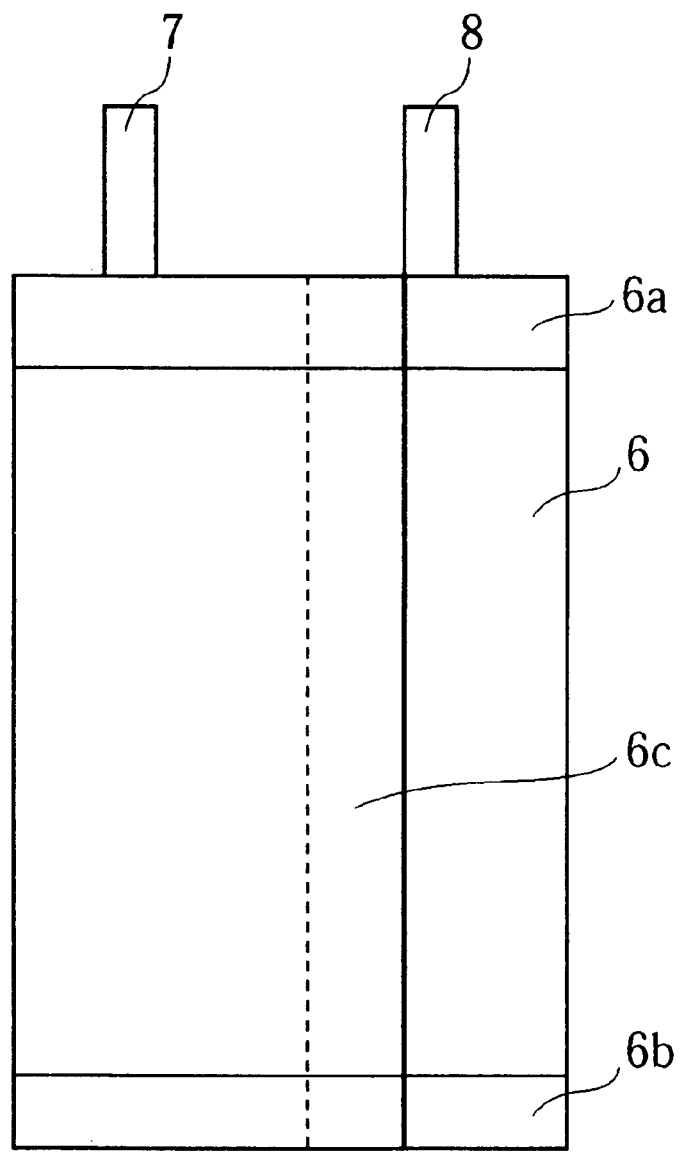
FIG. 14 is a rear view of a thin type sealed cell according to Example 5 of the present invention.
Figure 15:
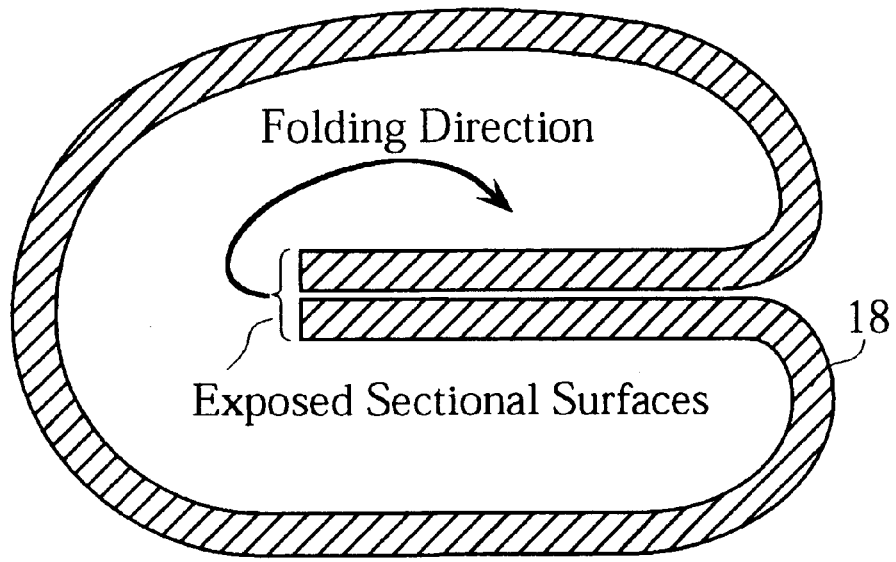
FIG. 15 is a cross-sectional view for explaining the steps of producing a cell case according to Example 5 of the present invention.
Figure 16:
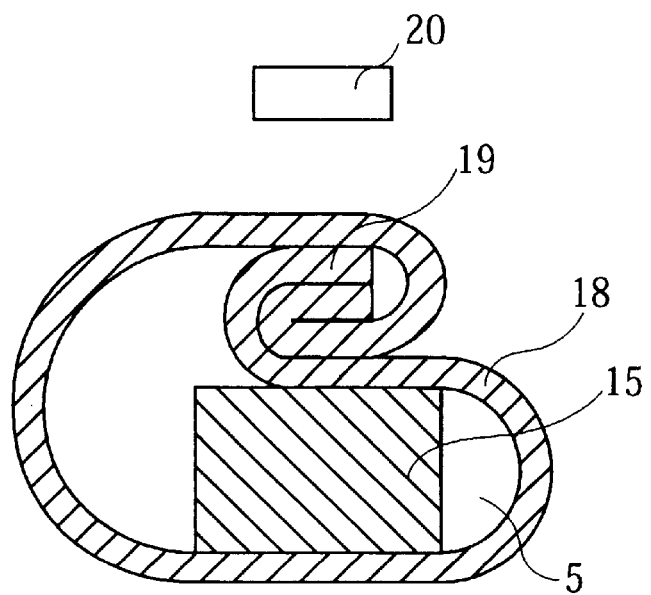
FIG. 16 is a cross-sectional view for explaining the steps of producing a thin type sealed cell according to Example 5 of the present invention.
Figure 17:
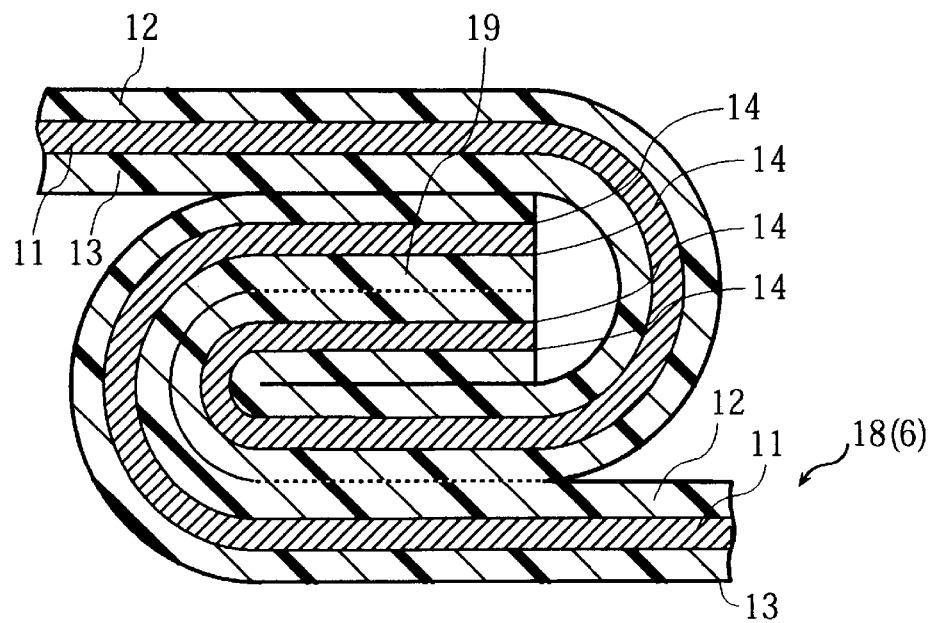
FIG. 17 is an enlarged cross-sectional view of a bonded part of a thin type sealed cell according to Example 5 of the present invention.

FIG. 14 shows a rear view of a thin type sealed cell according to Example 5. FIG. 15 shows a cross-sectional view for explaining the steps of producing a cell case according to Example 5. FIG. 16 shows a cross-sectional view for explaining the steps of producing a thin type sealed cell according to Example 5. FIG. 17 shows an enlarged cross-sectional view of a bonded part of a thin type sealed cell according to Example 5. As shown in FIGS. 14 to 17, the cell case according to Example 4 mainly differs from that of Example 1 in that the sealed portion 6c is formed on the back of the cell case, and in that a pair of exposed sectional surfaces opposed to each other exist inside the cell case.

The sealed portion 6c is, as shown in FIGS. 15 to 17, formed according to the following manner. The resin layers 12 and 13 on the outer surface of the laminated material 18 are overlapped, and thereafter the foremost end part of the overlapped portion 19 is folded at an angle of 180 degrees so as to be closely attached to a different portion of the resin layer. Then, while being kept in this state, the overlapped portion is subjected to fuse-bonding so as to form the sealed portion 6c.

According to this manner, the foremost end (exposed sectional surfaces) of the folded portion is wrapped up by the resin layer to which the folded portion is attached, and thereby isolated from the enclosure chamber 5. Hence, it is made possible to prevent the exposed interfaces 14 from making contact with the electrolyte and the like.

The cell produced in accordance with the above manner is hereinafter referred to as a "cell A3" of the present invention.

COMPARATIVE EXAMPLE 1

Figure 18:
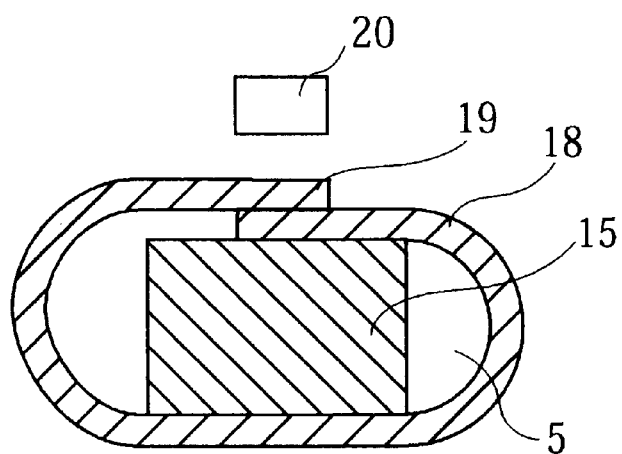
FIG. 18 is a cross-sectional view for explaining the steps of producing a thin type sealed cell according to Comparative Example 1.
Figure 19:
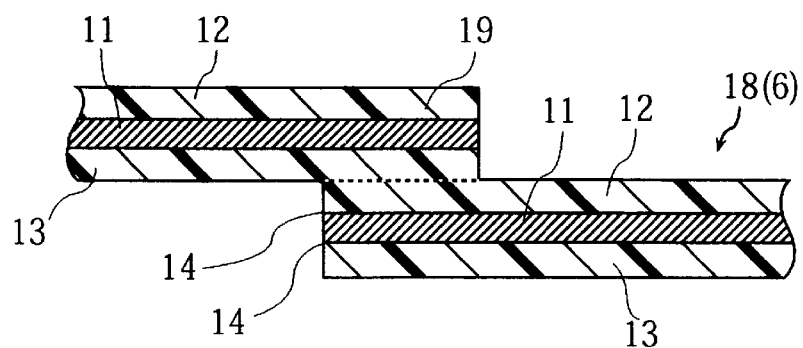
FIG. 19 is an enlarged cross-sectional view of a bonded part of a thin type sealed cell according to Comparative Example 1.

As shown in FIG. 18, a cell of Comparative Example 1 was produced in the same manner as in the above Example 2, except that the width of the overlapped portion (20 mm) and the width of the heater 20 (20 mm) were made to be equal. In the cell with this construction, as shown in FIG. 19, the exposed interfaces 14 are not covered with resin, but are exposed inside the enclosure chamber 5.

The cell produced in accordance with the above manner is hereinafter referred to as a "comparative cell X1".

COMPARATIVE EXAMPLE 2

Figure 20:
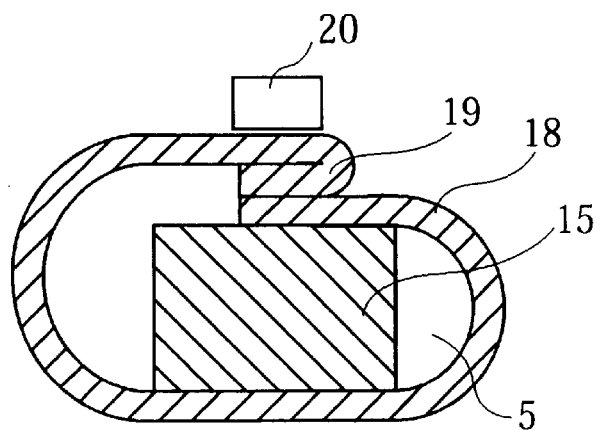
FIG. 20 is a cross-sectional view for explaining the steps of producing a thin type sealed cell according to Comparative Example 2.
Figure 21:
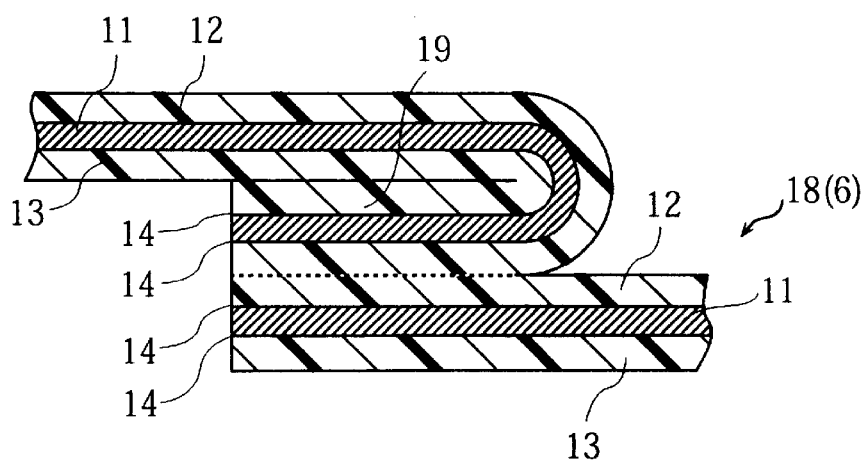
FIG. 21 is an enlarged cross-sectional view of a bonded part of a thin type sealed cell according to Comparative Example 2.

As shown in FIGS. 20 and 21, a cell of Comparative Example 2 was produced in the same manner as in the above Example 2, except that the width of the overlapped portion (20 mm) and the width of the heater 20 (20 mm) were made to be equal and that one end of the laminated material 18 is folded inwardly at an angle of 180 degrees. In the cell according to this construction, as shown in FIG. 21, the exposed interfaces 14 are not covered with resin, but are exposed inside the enclosure chamber 5.

The cell produced in accordance with the above manner is hereinafter referred to as a "comparative cell X1" of the present invention.

The cell produced in accordance with the above manner is hereinafter referred to as a "comparative cell X2".

EXPERIMENT

Using the cell A1 to A3, and the comparative cell X1 and X2, a rate of electrolyte leakage occurrences, which are induced by the detachment of the aluminum layer and the resin layer, was examined after those cells were stored at 60° C. for 20 days. The number of the samples was 100 per each type of the cells. The test results are shown in Table 1 below.

TABLE 1

| Cell Type | Electrolyte Leakage Occurrence Rate (%) |
| --- | --- |
| Cell A1 | 0 |
| Cell A2 | 0 |
| Cell A3 | 0 |
| Comparative Cell X1 | 4 |
| Comparative Cell X2 | 5 |

As seen from the above Table 1, the cells A1 to A3 according to the present invention all achieved an electrolyte leakage occurrence rate of 0%, while the comparative cell X1 and X2 showed the rates of 4% and 5% respectively. This is considered to be due to the following reasons. In the cell A1 to A3 of the present invention, either the exposed sectional surface exists outside the enclosure chamber or is covered with resin even when it exists inside the enclosure chamber. Therefore, it is made possible to prevent the deterioration of an adhesive strength in the adhesive layer, which is caused by the reaction of the adhesive layer and the electrolyte in the exposed interfaces, and the corrosion of the aluminum layer caused by the reaction of the fluoric acid and aluminum. On the other hand, in the comparative example cells X1 and X2, as illustrated in FIGS. 19 and 21, the end portion of the laminated material 18 exists inside the enclosure chamber and is exposed without being covered by resin. Therefore, it is considered that such high leakage occurrence rates in the comparative cells X1 and X2 are attributed to the decrease of the adhesive strength in the adhesive layer caused by the reaction of the adhesive layer, and to the corrosion of the aluminum layer caused by the reaction of the fluoric acid and aluminum.

As has been described thus far, in accordance with the present invention, it is made possible to protect the sectional surfaces at each end of the laminated material from being exposed in the enclosure chamber, and thereby to prevent the deterioration of the adhesive strength of the adhesive layer caused by the reaction of the adhesive layer and the electrolyte, and the corrosion of the aluminum layer caused by the reaction of the fluoric acid and aluminum. Hence, the leakage of the electrolyte out of the cell and the short circuit in the cell are prevented, and as a result of this, in a thin type sealed cell using a cell case composed of a sheet type laminated material, the increase in storage life and reliability can be achieved.

Although the present invention and its advantages have been described in detail, it should be understood that various changes, substitutions, and alterations can be made herein without departing from the spirit and scope of the invention as defined by the appended claims.

What is claimed is:

1. A thin type sealed cell comprising a cell case composed of a sheet type laminated material in which a resin layer is laminated on both surfaces of an aluminum layer with an adhesive layer interposed between said resin layer and aluminum layer, said cell case being formed by fuse-bonding together both end portions of said laminated material so as to form an enclosure chamber, said sealed cell further comprising an electrolyte and a power generating element both of which are enclosed in said enclosure chamber, said sealed cell characterized in that:

at least one of said end of the laminated material exists in said enclosure chamber, and a sectional surface of said end is covered with a resin.

2. A thin type sealed cell comprising a cell case composed of a sheet type laminated material in which a resin layer is laminated on at least one surface of an aluminum layer with an adhesive layer interposed between said resin layer and aluminum layer, said laminated material having an exposed sectional surface in which each of said layers is exposed, said cell case being formed by overlapping each other and fuse-bonding together both end portions adjacent to a pair of the exposed sectional surfaces at each end of said laminated material so as to form an enclosure chamber, said sealed cell further comprising an electrolyte and a power generating element both of which are enclosed in said enclosure chamber, said sealed cell characterized in that:

an inner surface of said cell case is said resin layer; and said pair of the exposed sectional surfaces are disposed inside said enclosure chamber and are covered with a resin.

* * * * *